United States Patent [19]

Inanaga et al.

[11] Patent Number: 5,696,420
[45] Date of Patent: Dec. 9, 1997

[54] VIBRATION TYPE GYROSCOPE APPARATUS

[75] Inventors: Kiyofumi Inanaga, Kanagawa; Yuji Yamada, Tokyo, both of Japan

[73] Assignee: Sony Corporation, Tokyo, Japan

[21] Appl. No.: 454,149

[22] PCT Filed: Nov. 15, 1994

[86] PCT No.: PCT/JP94/01930

§ 371 Date: Jul. 17, 1995

§ 102(e) Date: Jul. 17, 1995

[87] PCT Pub. No.: WO95/14212

PCT Pub. Date: May 26, 1995

[30] Foreign Application Priority Data

Nov. 17, 1993 [JP] Japan .................. 5-288432
Nov. 17, 1993 [JP] Japan .................. 5-288433

[51] Int. Cl.$^6$ .................................................. H01L 41/08
[52] U.S. Cl. ..................... 310/316; 310/321; 73/505
[58] Field of Search ............................ 310/316, 317, 310/319, 321, 329, 370; 73/505

[56] References Cited

U.S. PATENT DOCUMENTS

| | | | |
|---|---|---|---|
| Re. 34,121 | 11/1992 | Benoist | 356/350 |
| 4,489,609 | 12/1984 | Burdess et al. | 310/329 X |
| 4,810,922 | 3/1989 | Hirsch | 310/316 |
| 5,014,554 | 5/1991 | Terada et al. | 310/370 X |
| 5,124,707 | 6/1992 | Stove | 341/157 |
| 5,239,868 | 8/1993 | Takenaka et al. | 73/505 |
| 5,337,143 | 8/1994 | Mark | 356/350 |
| 5,349,857 | 9/1994 | Kasanami et al. | 310/316 X |
| 5,481,914 | 1/1996 | Ward | 73/504.16 |
| 5,495,759 | 3/1996 | Nakamura | 310/316 X |
| 5,531,091 | 7/1996 | Gademann et al. | 73/104 |

*Primary Examiner*—Mark O. Budd
*Attorney, Agent, or Firm*—Jay H. Maioli

[57] ABSTRACT

A vibration type gyroscope apparatus of digital type which is good in operability and high in detection accuracy includes a variable gain amplifier (3), for amplifying a detection signal of a vibration type gyroscope, and an analog to digital converter (5), for converting an output signal of the variable gain amplifier (3) into a digital signal, are integratedly contained in the vibration type gyroscope apparatus. Accordingly, the detection signal is amplified and converted into a digital signal at a range as near as possible to a vibration type gyroscope (1) to thereby prevent the detection signal from being deteriorated by the influence of external noise in a transmission line. Accordingly, the transmission line can be used effectively, so that the signal can be transmitted at high-grade and high-fidelity.

12 Claims, 4 Drawing Sheets

VIBRATION TYPE GYROSCOPE APPARATUS

TECHNICAL FIELD

The present invention relates to a vibration gyroscope apparatus for digitally detecting, for example, the swinging motion of a moving body.

BACKGROUND ART

Heretofore, there have been various kinds of gyroscopes for detecting the swinging motion of a moving body. The various kinds of gyroscopes differ in their operation, characteristics and usage. Accordingly, it is known that the different kinds of gyroscopes are not always suitable for the various intended purposes of use.

Consideration will be made as to a gyroscope which detects the motion of the head of a listener and which is used in an audio reproducing apparatus, as disclosed for example, in Japanese Patent Publication No. 42-227, Japanese Patent Publication No. 54-19242 and Japanese Patent Laid-Open Publication No. 01-112900 which have been filed by the same applicant as in the present application.

In the aforementioned audio reproducing apparatus, headphones can reproduce an audio signal having the same feelings of effect as to localization, sound field, etc. as an audio signal that is reproduced from speakers which are placed in predetermined positions.

This apparatus is used in a system which reproduces a multi-channel audio signal recorded as a stereo signal or the like. Particularly, when an audio signal recorded or transmitted through multiple channels is reproduced from headphones, etc., the respective sound images are localized in a predetermined positional relation, for example, in front right, front left, center, etc. That is, the motion of the listener's is detected by a gyroscope, which thereby reads a control signal, or the like, which controls the audio signal supplied to both ears of the listener from virtual sound source positions in reference to the direction of the head of the listener. Then, the audio signals inputted to the respective channels are corrected and changed by this control signal. As a result, a reproducing effect is obtained as if the audio sound were reproduced from the speakers placed in the virtual sound source positions.

Accordingly, since the gyroscope for detecting the motion of the head of the listener used in this case is mounted on the head of the listener, the gyroscope is required to be small size, light weight, low dissipation power, long life, easy to handle and low cost.

The related art type gyroscope, however, has a highspeed rotating body therein and is called "top type gyroscope", employing the characteristic of a top. Accordingly, the related art type gyroscope has a disadvantage of a short life of not more than several thousands of hours. Further, since most of the related art type gyroscope employs electromagnetic type pickups as motor driving pickups and as detection pickups, dissipation power is large. Further, since the related art type gyroscope requires a special AC power source, a special circuit is required when the gyroscope is used.

Further, since the related art type gyroscope is large in weight and volume and high in cost and has a high-speed rotating body, it is necessary to handle the gyroscope very carefully. Accordingly, the related art type gyroscope is not suitable for holding it over the head so as to detect the rotation of the head.

Particularly, in order to detect a rotating motion with respect to a plurality of axes, a plurality of gyroscopes are required. Further, the gyroscopes using inertia force are required to be attached to the same place disadvantageously.

When the aforementioned top type gyroscopes are used, there is no limitation that the gyroscopes must be attached to the same place. The top type gyroscopes are, however, not suitable for the aforementioned purpose of use since it requires small size, light weight, low dissipation power, long life, easiness to handle and low cost.

A vibration type gyroscope may be employed as a gyroscope which makes up for the disadvantages of the top type gyroscope. Such a vibration type gyroscope electromagnetically vibrates a vibrating body, made of various shapes instead of a rotating body and detects the vibration thereof. As a result, the condition of the gyroscopes is such that size is small, weight is light, dissipation power is low, life is long, handling is easy, cost is low. As can be seen the conditions of the vibration type gyroscope are considerably improved.

However, although the vibration type gyroscope can improve the aforementioned conditions as compared with the top type gyroscope, the vibration type gyroscope can not satisfy the aforesaid conditions well enough as to dissipation power, sensitivity, volume, weight, etc.

Therefore, a piezoelectric vibration type gyroscope, using a piezoelectric element for vibration and/or detection, is used instead of the generally used vibration type gyroscope, which electromagnetically vibrates a vibrating body made of various shapes and detects the vibration thereof. As a result, such conditions of the gyroscope that size is small, weight is light, dissipation power is low, life is long, handling is easy, cost is low, etc. can be further satisfied and improved.

The piezoelectric vibration type gyroscope of the related art is, however, of an analog type, so that the analog type vibration gyroscope is influenced easily by external noise. Further, in the analog type vibration gyroscope, the line capacity of a transmission line increases as the length of the transmission line increases, so that particularly a high-band signal is likely deteriorated. In order to prevent such signal deterioration, it is necessary to use thick cables. It is, however, difficult to use these thick cables in order to detect the swinging of the moving body. Particularly, when a large number of piezoelectric vibration type gyroscopes are used, the swinging of the moving body may be made impossible to detect. Further, when the detected vibration state is transmitted by a radio transmission apparatus through electromagnetic wave or the like, there arises a disadvantage in that the transmitted wave is likely influenced by external disturbance because an analog modulation method is used.

Further, when the analog output of the piezoelectric vibration type gyroscope of the related art is converted into a digital output, the analog output of the piezoelectric vibration type gyroscope is not always equal to the detection output itself, and the analog output is influenced by various modulations such as amplitude modulation, etc. Accordingly, the modulated output must be demodulated to obtain a correct detection output, whereby additional processes such as an averaging process, etc. is required for finally obtaining a discrete digital signal sequence. As a result, there arises a disadvantage in that a time lag or distortion of the signal occurs.

Further, the piezoelectric vibration type gyroscope of the related art can perform transmission only in one direction. Accordingly, the vibrating body must be stopped when fine measurement conditions are set in accordance with the vibrating state of the vibrating body, thereby causing a disadvantage so that the piezoelectric vibration type gyroscope of the related art is troublesome to handle.

In addition, the vibration is detected in the form of different dimensions, such as velocity, angular velocity, displacement or angle depending on the conversion method of the detector. Accordingly, the vibration output must be supplied to an outside integrator or a differentiator to thereby correct the detected vibration in a vibration form of the required dimension, thereby causing a disadvantage in that the gyroscope is troublesome to handle.

DISCLOSURE OF THE INVENTION

The present invention has been made in view of the aforesaid aspect, and hence it is an object of the present invention to provide a vibration type gyroscope apparatus which is good in operability and high in detection accuracy.

According to a first aspect of the present invention, there is provided a vibration type gyroscope apparatus which includes a vibration type gyroscope for detecting the swinging motion of a moving body, a variable gain amplifier for amplifying a detection output of the vibration type gyroscope, and an analog to digital converter for converting an output signal of the variable gain amplifier into a digital signal, wherein the vibration type gyroscope, the variable gain amplifier and the analog to digital converter are integratedly contained in an apparatus body. In this vibration type gyroscope apparatus, since the variable gain amplifier for amplifying the detection signal of the vibration type gyroscope and the analog to digital converter for converting the output signal of the variable gain amplifier into the digital signal are integratedly contained in the apparatus body, the detection signal of the vibration type gyroscope is amplified and converted into the digital signal at a range as near as possible to the vibration type gyroscope. Accordingly, the detection signal is prevented from being deteriorated by the influence of external noise in the transmission line. As a result, the transmission line can be used effectively, so that the signal can be transmitted at high-grade and high-fidelity.

Further, according to a second aspect of the present invention, the vibration type gyroscope apparatus further includes a band-pass filter of a variable band width, contained in the apparatus body and provided for limiting the frequency band of the output signal of the variable gain amplifier to a predetermined range, wherein an output signal of the band-pass filter is supplied to the analog to digital converter. In this configuration, the variable gain amplifier for amplifying the detection signal of the vibration type gyroscope, the band-pass filter of a variable band width for limiting the frequency band of the output signal of the variable gain amplifier to the predetermined range and the analog to digital converter for converting the output signal of the band-pass filter into the digital signal are integratedly contained in the apparatus body. Accordingly, the amplification of the detection signal of the vibration type gyroscope, the limitation of the frequency band of the output signal of the variable gain amplifier to the predetermined range and the analog to digital conversion of the output signal of the band-pass filter are performed at a range as near as possible to the vibration type gyroscope. Therefore, the detection signal is prevented from being deteriorated by the influence of external noise in the transmission line. As a result, the transmission line can be used effectively, so that the signal can be transmitted at high-grade and high-fidelity.

Further, according to a third aspect of the present invention, the vibration type gyroscope apparatus further includes a control circuit contained in the apparatus body and provided for generating first, second and third control signals to control the amplification factor of the variable gain amplifier, the band width of the band-pass filter and the sampling rate of the analog to digital converter, respectively, on the basis of a digital control signal supplied from outside of the apparatus body. In this configuration, the control circuit for generating the first, second and third control signals to control the amplification factor of the variable gain amplifier, the band width of the band-pass filter and the sampling rate of the analog to digital converter, respectively, on the basis of the digital control signal supplied from outside of the apparatus body is integratedly contained in the apparatus body. Accordingly, the dynamic range of the analog to digital conversion is effectively used by controlling the amplification factor and the band width. As a result, a detection signal with little distortion and a good S/N ratio can be transmitted, so that the apparatus can be improved in operability thereby be adapted to a wide-range of purposes of use.

Further, according to a fourth aspect of the present invention, the vibration type gyroscope apparatus further includes a linear correction circuit, contained in the apparatus body and provided in the output side of the analog to digital converter, for correcting the nonlinear characteristic of the vibration type gyroscope. In this configuration, since the linear correction circuit for correcting the nonlinear characteristic of the vibration type gyroscope is integratedly contained in the apparatus body, the nonlinear characteristic of the detection signal of the vibration type gyroscope is corrected to prevent the detection signal from being deteriorated by the influence of external noise in the transmission line. Accordingly, the transmission line can be used effectively, so that the signal can be transmitted at higher-grade and higher-fidelity.

Further, according to a fifth aspect of the present invention, the vibration type gyroscope apparatus further includes a band-pass filter of a variable band width contained in the apparatus body and provided for limiting the frequency band of the output signal of the variable gain amplifier to a predetermined range, wherein an output signal of the band-pass filter is supplied to the analog to digital converter. In this configuration, since the linear correction circuit for correcting the nonlinear characteristic of the vibration type gyroscope is integratedly contained in the apparatus body, the frequency band is limited to the predetermined range and the nonlinear characteristic of the detection signal of the vibration type gyroscope is corrected to thereby prevent the detection signal from being deteriorated by the influence of external noise in the transmission line. Accordingly, the transmission line can be used effectively, so that the signal can be transmitted at higher-grade and higher-fidelity.

Further, according to a sixth aspect of the present invention, the vibration type gyroscope apparatus further includes a dimension converter, contained in the apparatus body and provided in the output side of the analog to digital converter, for converting the dimension of detection vibration of the vibration type gyroscope. In this configuration, since the dimension converter for converting the dimension of the detection signal of the vibration type gyroscope is integratedly contained in the apparatus body, the dimension of the detection signal can be converted into a required dimension.

Further, according to a seventh aspect of the present invention, the vibration type gyroscope apparatus further includes a band-pass filter of a variable band width contained in the apparatus body and provided for limiting the frequency band of the output signal of the variable gain amplifier to a predetermined range, wherein an output signal of the band-pass filter is supplied to the analog to digital converter. In this configuration, since the dimension converter for converting the dimension of the detection signal of the vibration type gyroscope is integratedly contained in the apparatus body, the dimension of the detection signal can be converted into the required dimension while the frequency band is limited to the predetermined range.

Further, in the vibration type gyroscope apparatus according to an eighth aspect of the present invention, the dimension converter is constituted by a differentiator. In this configuration, the frequency band is limited to a predetermined range by the differentiator, so that the dimension of the detection signal can be converted into a required dimension.

Further, in the vibration type gyroscope apparatus according to a ninth aspect of the present invention, the dimension converter is constituted by an integrator. In this configuration, the frequency band is limited to a predetermined range by the integrator, so that the dimension of the detection signal can be converted into a required dimension.

Further, in the vibration type gyroscope apparatus according to a tenth aspect of the invention, the vibration type gyroscope is constituted by a piezoelectric vibration type gyroscope using a piezoelectric element for detecting the swinging motion of the moving body. In this configuration, since the variable gain amplifier for amplifying the detection signal of the piezoelectric vibration type gyroscope and the analog to digital converter for converting the output signal of the variable gain amplifier into the digital signal are integratedly contained in the apparatus body, the detection signal of the piezoelectric vibration type gyroscope is amplified and converted into the digital signal at a range as near as possible to the piezoelectric vibration type gyroscope. Accordingly, the detection signal is prevented from being deteriorated by the influence of external noise in the transmission line. As a result, the transmission line can be used effectively, so that the signal can be transmitted at high-grade and high-fidelity.

Further, according to an eleventh aspect of the present invention, the vibration type gyroscope apparatus further includes a band-pass filter of a variable band width contained in the apparatus body and provided for limiting the frequency band of the output signal of the variable gain amplifier to a predetermined range, wherein an output signal of the band-pass filter is supplied to the analog to digital converter. In this configuration, the variable gain amplifier for amplifying the detection signal of the piezoelectric vibration type gyroscope, the band-pass filter of a variable band width for limiting the frequency band of the output signal of the band-pass filter to the predetermined range and the analog to digital converter for converting the output signal of the variable gain amplifier into the digital signal are integratedly contained in the apparatus body. Accordingly, the amplification of the detection signal of the piezoelectric vibration type gyroscope, the limitation of the frequency band of the output signal of the variable gain amplifier to a predetermined range and the analog to digital conversion of the output signal of the band-pass filter are performed at a range as near as possible to the piezoelectric vibration type gyroscope. Accordingly, the detection signal is prevented from being deteriorated by the influence of external noise in the transmission line. As a result, the transmission line can be used effectively, so that the signal can be transmitted at high-grade and high-fidelity.

Further, according to a twelfth aspect of the present invention, the vibration type gyroscope apparatus further includes a control circuit contained in the apparatus body and provided for generating first, second and third control signals to control the amplification factor of the variable gain amplifier, the band width of the band-pass filter and the sampling rate of the analog to digital converter, respectively, on the basis of a digital control signal supplied from outside of the apparatus body. In this configuration, the control circuit for generating control signals for controlling the amplification factor of the variable gain amplifier, the band width of the band-pass filter and the sampling rate of the analog to digital converter, respectively, on the basis of the digital control signal supplied from the outside of the apparatus body is integratedly contained in the apparatus body. Accordingly, the dynamic range of the analog to digital conversion is effectively used by controlling the amplification factor and the band width. As a result, a detection signal with little distortion and a good S/N ratio can be transmitted, so that the apparatus can be improved in operability and adapted to a wide-range of purposes of use.

Further, according to a thirteenth aspect of the present invention, the vibration type gyroscope apparatus further includes a linear correction circuit, contained in the apparatus body and provided in the output side of the analog to digital converter, for correcting the nonlinear characteristic of the piezoelectric vibration type gyroscope. In this configuration, since the linear correction circuit for correcting the nonlinear characteristic of the piezoelectric vibration type gyroscope is integratedly contained in the apparatus body, the nonlinear characteristic of the detection signal of the piezoelectric vibration type gyroscope is corrected to prevent the detection signal from being deteriorated by the influence of external noise in the transmission line. Accordingly, the transmission line can be used effectively, so that the signal can be transmitted at higher-grade and higher-fidelity.

Further, according to a fourteenth aspect of the present invention, the vibration type gyroscope apparatus further includes a band-pass filter of a variable band width contained in the apparatus body and provided for limiting the frequency band of the output signal of the variable gain amplifier to a predetermined range, wherein an output signal of the band-pass filter is supplied to the analog to digital converter. In this configuration, since the linear correction circuit for correcting the nonlinear characteristic of the piezoelectric vibration type gyroscope is integratedly contained in the apparatus body, the limitation of the frequency band to a predetermined range and the correction of the nonlinear characteristic of the detection signal of the piezoelectric vibration type gyroscope are performed to prevent the detection signal from being deteriorated by the influence of external noise in the transmission line. Accordingly, the transmission line can be used effectively, so that the signal can be transmitted at higher-grade and higher-fidelity.

Further, according to a fifteenth aspect of the present invention, the vibration type gyroscope apparatus further includes a dimension converter contained in the apparatus body and provided in the output side of the analog to digital converter for converting the dimension of detection vibration of the vibration type gyroscope. In this configuration, the dimension of the detection signal can be converted into a required dimension since the dimension converter for converting the dimension of the detection signal of the piezoelectric vibration type gyroscope is integratedly contained in the apparatus body.

Further, according to a sixteenth aspect of the present invention, the vibration type gyroscope apparatus further includes a band-pass filter of a variable band width contained in the apparatus body and provided for limiting the frequency band of the output signal of the variable gain amplifier to a predetermined range, wherein an output signal of the band-pass filter is supplied to the analog to digital converter. In this configuration, the dimension of the detection signal can be converted into a required dimension while the frequency band is limited to the predetermined range since the dimension converter for converting the dimension of the detection signal of the piezoelectric vibration type gyroscope is integratedly contained in the apparatus body.

Further, in the vibration type gyroscope apparatus according to a seventeenth aspect of the present invention, the dimension converter is constituted by a differentiator. In this configuration, the frequency band is limited to a predetermined range by the differentiator, so that the dimension of the detection signal can be corrected to a required dimension.

Further, in the vibration type gyroscope apparatus according to an eighteenth aspect of the present invention, the dimension converter is constituted by an integrator. In this configuration, the frequency band is limited to a predetermined range by the integrator, so that the dimension of the detection signal can be corrected to a required dimension.

Further, according to a nineteenth aspect of the present invention, there is provided a vibration type gyroscope apparatus which includes a rod-like piezoelectric device for vibration provided with a pair of piezoelectric elements for detection, and a pair of piezoelectric elements for driving, a differential amplifier for obtaining a differential output between output signals of the pair of piezoelectric elements for detection, an arithmetic operation circuit for multiplying an output signal of the differential amplifier by a driving signal supplied to the piezoelectric elements for driving, and an encoding circuit for performing analog to digital conversion and encoding as to an output signal of the arithmetic operation circuit by using, as sampling frequency, N (N=1, 2, 3 ...) times and 1/N times as much as the frequency of the driving signal. In this configuration, since the amplitude-modulated detection signal is converted into a digital signal which uses the peak values of the amplitude-modulated detection signal as quantized data thereof directly and uses the polarity of the synchronous detection output as a sign bit thereof, the detection signal is hardly influenced by external noise and the transmission signal is little deteriorated.

Further, according to a twentieth aspect of the present invention, the vibration type gyroscope apparatus further includes a band-pass filter for removing carrier components in the output signal from the arithmetic operation circuit, wherein an output signal of the band-pass filter is supplied to the encoding circuit. In this configuration, the amplitude-modulated detection signal is converted into a digital signal which is obtained by removing carrier components from the amplitude-modulated detection signal and the driving signal and uses the polarity of the synchronous detection output as a sign bit. Accordingly, the detection signal is hardly influenced by external noise and the transmission signal is little deteriorated.

BRIEF DESCRIPTION OF THE DRAWINGS

FIG. 4 is made up of two diagrams used for explaining the operation of the vibration type gyroscope apparatus according to the present invention, in which

BEST MODE FOR CARRYING OUT THE INVENTION

Figure 1:
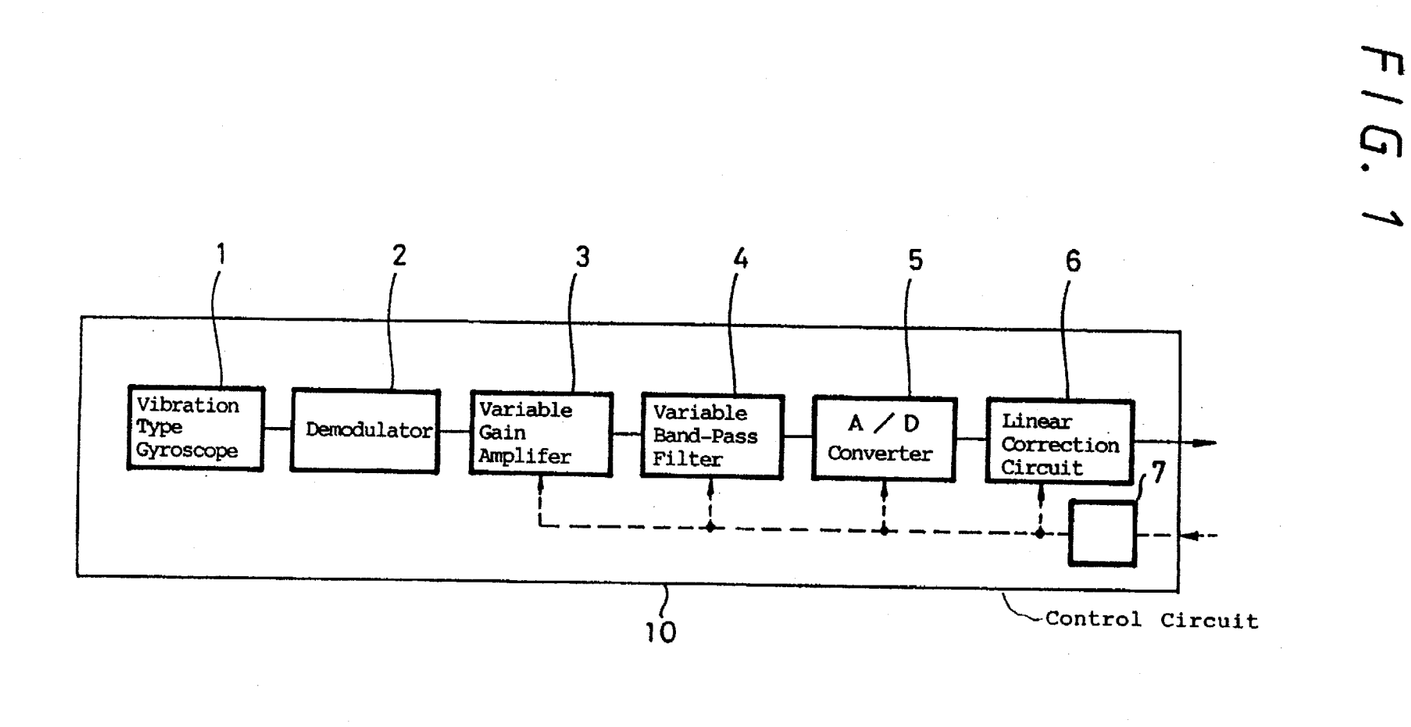
FIG. 1 is a block diagram of an embodiment of a vibration type gyroscope apparatus according to the present invention.

FIG. 1 is a block diagram showing the configuration of an embodiment of a vibration type gyroscope apparatus according to the present invention. The vibration type gyroscope apparatus 10 includes a vibration type gyroscope 1, a demodulator 2, a variable gain amplifier 3, a variable band-pass filter 4, an analog-to-digital (A/D) converter 5, a linear correction circuit 6 and a control circuit 7.

The vibration type gyroscope 1 is designed so that an electric signal changes correspondingly to the level of vibration at its output terminal when vibration is transmitted thereto. As for a linear motion, a vibration type pickup is employed that can detect acceleration, velocity and displacement. As for a rotating motion, a gyroscope, or the like, is employed that can detect angular acceleration, angular velocity and angular change.

The detection signal of such a vibration type gyroscope 1 may represent a change of vibration directly or may be outputted in the form of a modulated wave. When the detection signal is outputted in the form of a modulated wave, the change of the detection signal is taken out by the demodulator 2. For example, an electric current proportional to a vibration velocity is outputted from a velocity pickup. When a vibration type gyroscope is employed, a demodulation process such as synchronous detection, or the like, is required because a signal amplitude-modulated and proportional to angular velocity (Coriolis force) is outputted from the gyroscope.

The level of the detection signal thus outputted is small, so that the detection signal is amplified by the variable gain amplifier 3 so that the detection signal can use the dynamic range of the A/D converter 5 in the succeeding stage effectively. The variable band-pass filter 4, for limiting the band, extracts a required band from the detection signal amplified by the variable gain amplifier 3.

The variable gain amplifier 3 and the variable band-pass filter 4 are designed so that the amplification factor and the band width thereof, as well as the sampling rate of the A/D converter, 5 can be controlled from the outside, since the vibration of a moving body is not always constant and the band of the required signal is not always constant.

By this configuration, the dynamic range of the A/D converter 5 can be used more effectively. The control circuit 7 receives a digital control signal from the outside and generates a required control signal to supply a control signal to the variable gain amplifier 3, the variable band-pass filter 4 and the A/D converter 5. When a central processing unit (CPU) is provided in the vibration type gyroscope apparatus 10, the control circuit 7 may be formed by the CPU.

The analog vibration detection signal in which the level of the amplification factor and the band width have been adjusted as described above, is converted into a digital signal by the A/D converter 5. Then, the nonlinear characteristic of detection elements of the vibration type gyroscope 1 is corrected by the linear correction circuit 6. The correction value of the nonlinear characteristic is amended correspondingly to the amplification factor set from the outside on the basis of the control signal supplied from the control circuit 7.

The thus configured vibration type gyroscope apparatus operates as follows. Since the amplification of the vibration detection signal, the limitation of the frequency band width thereof and the analog to digital conversion thereof are performed in a range near to the vibration type gyroscope 1, a vibration detection signal with little distortion and a good S/N ratio can be transmitted. Furthermore, since the amplification factor of the vibration detection signal, that is, the sensitivity of vibration detection, and the band of the vibration detection signal can be controlled at a position apart from the vibration type gyroscope apparatus 10, the apparatus can be improved in operability and adapted to a wide-range of purposes of use.

Further, since the sampling rate can also be changed correspondingly to the setting of a required band, a larger number of detection signals can be transmitted by means of time-division multiplexing. Further, the number of electric wires used in the transmission line can be reduced greatly by using the characteristic of the digital output signal, so that the signal can be transmitted economically and with little signal deterioration.

In addition, since the nonlinear characteristic of the vibration type gyroscope 1 is corrected by digital processing after the detection signal is converted into the digital signal, the vibration type gyroscope apparatus, having a very good linear characteristic, can be configured.

Figure 2:
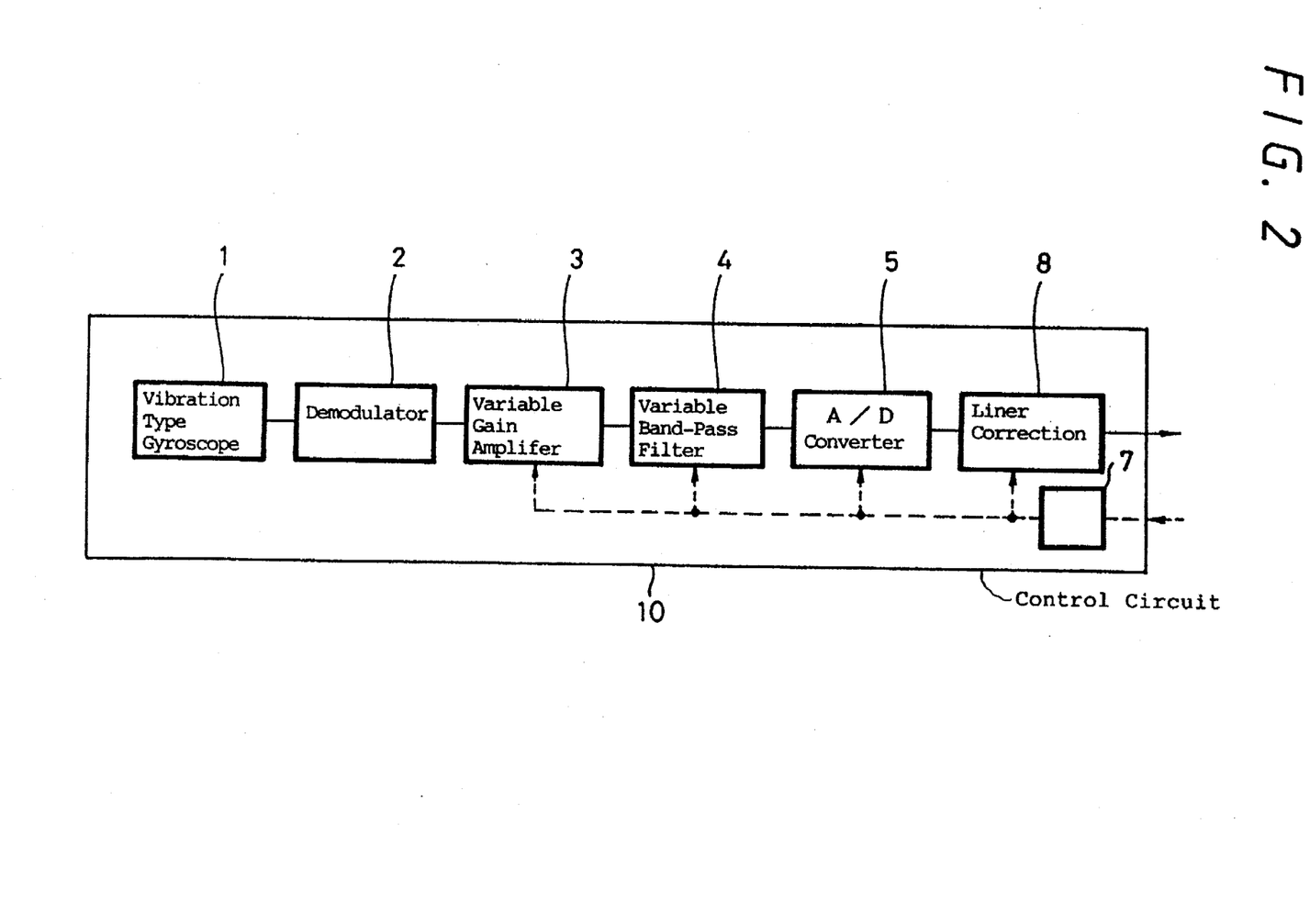
FIG. 2 is a block diagram of another embodiment of the vibration type gyroscope apparatus according to the present invention.

FIG. 2 is a block diagram showing the configuration of another embodiment of the vibration type gyroscope apparatus according to the present invention. In FIG. 2, the same parts corresponding to those of FIG. 1 are marked with the same reference numerals, and therefore, the detailed explanation thereof will be omitted. The vibration type gyroscope apparatus shown in FIG. 2 differs from the vibration type gyroscope apparatus shown in FIG. 1 in a point that the linear correction circuit 6 for detection elements of the vibration type gyroscope apparatus in FIG. 1 is replaced by a dimension converter 8.

The dimension converter 8 is constituted, for example, by a differentiator or an integrator. The dimension converter 8 operates so that the dimension of the vibration detection signal is amended correspondingly to the conversion theory of the vibration type gyroscope 1. Accordingly, the dimension of vibration can be converted by providing the dimension converter 8, so that the vibration detection can be performed with higher accuracy.

Although the arithmetic operation of differentiation or integration by the dimension converter 8 in this example may be carried out as an analog arithmetic operation, such an arithmetic operation can be carried out with higher accuracy when the arithmetic operation is executed at the stage of the digital signal as shown in FIG. 2. Further, since the dimension converter 8 is controlled by the control circuit 7, the dimension converter can realize an arbitrary characteristic in accordance with the control signal supplied from the outside.

Further, an arithmetic operation portion and a filter portion, necessary for the differentiator or the integrator of the dimension converter 8, may be also used. In this case, a digital filter, such as an infinite impulse response (IIR) digital filter, finite impulse response (FIR) digital filter or the like, may be selected in accordance with the intended purpose of use.

Figure 3:
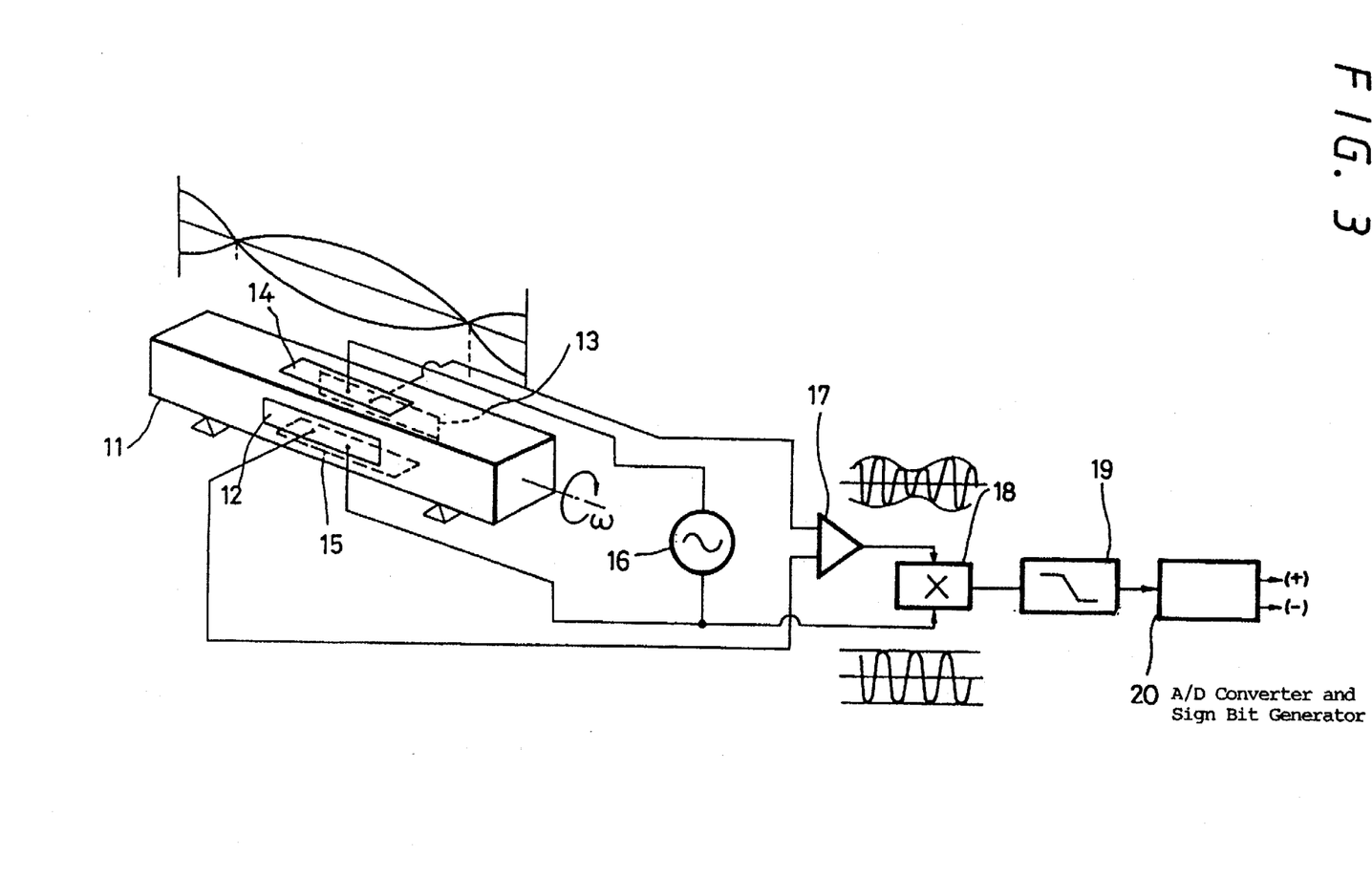
FIG. 3 is a detailed circuit diagram showing the operation of the vibration type gyroscope used for the vibration type gyroscope apparatus according to the present invention.

FIG. 3 shows a detailed circuit showing the operation of the vibration type gyroscope 1. In FIG. 3, a vibration quadrangular prism 11 of a regular square section is formed by one of various vibrators. Detection elements 12 and 13 are attached to a pair of opposite surfaces of the vibration quadrangular prism 11, and driving elements 14 and 15 are attached to the other pair of opposite surfaces thereof. Although the detection elements 12, 13 and the driving elements 14, 15 are designed so as to electromagnetically detect the vibration of the vibrator and drive the vibrator by using magnetostrictive elements, respectively, these elements may be formed by piezoelectric elements. Any type of detection elements may be used so long as they can detect the vibration of the vibration quadrangular prism 11 in the form of the quantity of displacement thereof.

A driving signal source 16 is connected to the driving elements 14 and 15 so that an alternating signal is supplied thereto. The outputs of the detection elements 12 and 13 are supplied to a differential amplifier 17. The differential output of the differential amplifier 17 and the output of the driving signal source 16 are supplied to a multiplier or a phase detector 18 so that these outputs are multiplied by each other or subjected to phase detection. The output of the multiplier or phase detector 18 is supplied to a band-limit filter 19 so that carrier components thereof are removed. Then, the output of the band-limit filter 19 is supplied to an A/D converter and sign bit generator 20 so that the direction of rotation, that is, right or left, is detected on the basis of the sign outputted from the A/D converter and sign bit generator 20.

Figure 4A:
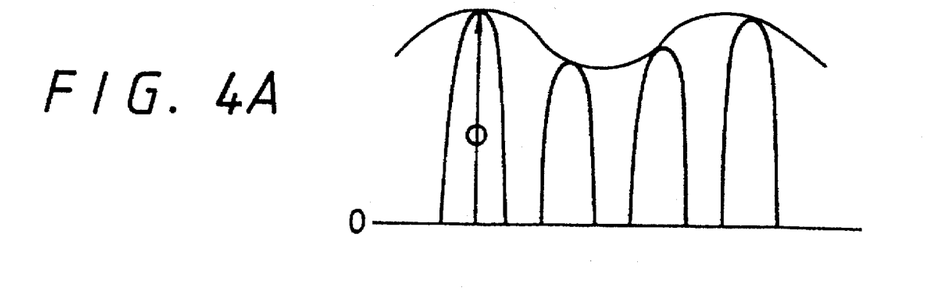
FIGS. 4A and 4B are diagrams showing a detection signal and a driving signal, respectively.
Figure 4B:
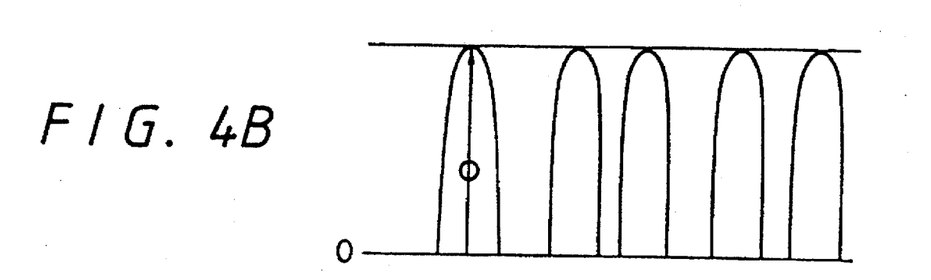
Figure 5:
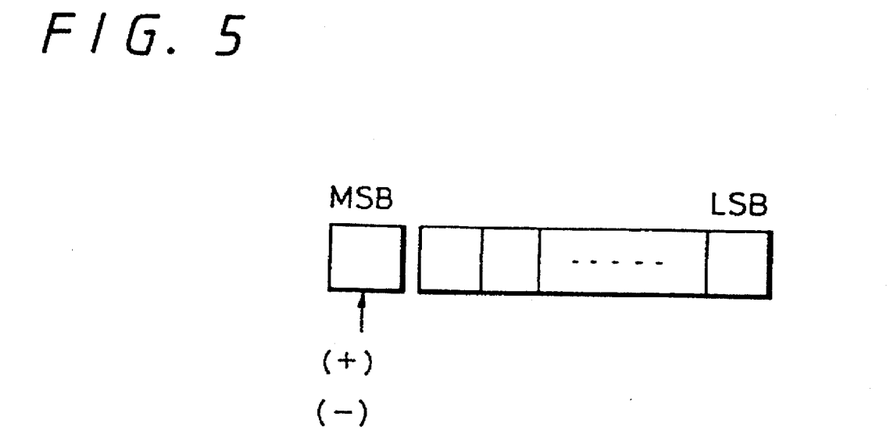
FIG. 5 is a diagram used for explaining the operation of the vibration type gyroscope apparatus according to the present invention.

The vibration type gyroscope thus configured operates as follows, as shown in FIG. 4 and 5. First, when an alternating signal with a natural oscillation frequency peculiar to the vibration quadrangular prism 11 is applied to the driving elements 14 and 15, the vibration quadrangular prism 11 is forced to vibrate on the basis of the vibration waveform shown in the drawings. This vibration generates resonance in a predetermined mode.

In this case, there is no output from the detection elements 12 and 13 as long as no external force is applied to the vibration quadrangular prism. When a rotation force of angular velocity 107 is axially applied to the vibration quadrangular prism 11, the alternating signal or forced vibration serving as a carrier, is amplitude-modulated by the Coriolis force to generate a detection signal as shown in FIG. 4A. In this case, the magnitude of the amplitude of the detection signal is proportional to the angular velocity $\omega$ of rotation which acts on the axis. The direction of rotation of the detection signal corresponds to the direction of phase displacement of the detection signal relative to the driving signal as shown in FIG. 4B.

Accordingly, the amplitude-modulated detection signal is multiplied by the driving signal, and a signal obtained by the multiplication is passed through the band-limit filter 19 acting as a low-pass filter to remove carrier components thereof to thereby make a resultant signal as a detection signal.

In this case, error of arithmetic operation occurs in the multiplying operation of the multiplier or phase detector 18, or a time lag occurs when the signal passes through the band-limit filter 19. Accordingly, an A/D converter 20 is provided which employs sampling frequency of N (N=1, 2, 3 . . . ) times as much as the frequency of the amplitude-modulated detection signal as shown in FIG. 4A, 1/N times as much as the frequency of the driving signal as shown in FIG. 4B, and also employs as a sampling point the sample value of the peak value of the amplitude-modulated signal. Further, the A/D converter and sign bit generator 20 is provided which employs as a sample point the sample value of the peak value of the amplitude-modulated signal and also employs sign bit data as shown in FIG. 5 the sign of the synchronous detection output between a reference carrier and the amplitude-modulated signal. Furthermore, the band-limit filter 19 corresponding to the sampling frequency is provided at the prior stage of the A/D converter and sign bit generator 20. FIG. 4 shows an example in which the peak values are sampled only by noting the polarity of the signal. Further, in FIG. 5, MSB will be a plus sign in an in-phase state and a minus sign in an antiphase state, and data will be filled up to LSB.

In this manner, the amplitude-modulated signal is converted into a digital signal in which the peak value of the amplitude-modulated detection signal is employed as it is as quantitized data and in which the polarity of the synchronous detection output is employed as a sign bit. Accordingly, the detection signal is hardly influenced by external noise and the transmission signal is little deteriorated.

In the aforementioned embodiment, the analog output signal representing the detected vibration is converted into the digital signal at a range near to the detection elements. Accordingly, the detection signal is hardly influenced by external noise and the transmission signal is little deteriorated.

Further, in the aforementioned embodiment, the linear correction circuit for correcting the nonlinear characteristic of the detection elements and the dimension converter for converting the dimension of vibration detection are contained in the vibration type gyroscope apparatus. Accordingly, a signal obtained by correcting the nonlinear characteristic of the detection elements and converting the dimension of vibration with high accuracy can be outputted.

Further, in the aforementioned embodiment, since a thick and heavy-weight cable is not required, a thin and light-weight cable such as an optical cable, or the like, can be employed.

Further, in the aforementioned embodiment, even when a plurality of vibration type gyroscope apparatuses are used, a configuration suitable for detecting the vibration of a moving body can be realized by employing a time-division multiplex transmission system without necessitating a large number of transmission lines.

Further, in the aforementioned embodiment, even when the detected vibration signal is transmitted as a digital signal by in a wireless manner, the signal can scarcely be influenced by an external disturbance.

Further, in the aforementioned embodiment, setting conditions of the apparatus can be accomplished easily from a remote place by employing two-way communication.

According to the present invention, since the variable gain amplifier for amplifying the detection signal of the vibration type gyroscope and the analog to digital converter for converting the output signal of the variable gain amplifier into the digital signal are integratedly contained in the apparatus body, the detection signal of the vibration type gyroscope is amplified and converted into the digital signal at a range as near as possible to the vibration type gyroscope. Accordingly, the detection signal is prevented from being deteriorated by the influence of external noise in the transmission line. As a result, the transmission line can be used effectively, so that the signal can be transmitted at high-grade and high-fidelity.

Further, according to the present invention, the variable gain amplifier for amplifying the detection signal of the vibration type gyroscope, the band-pass filter of a variable band width for limiting the frequency band of the output signal of the variable gain amplifier to the predetermined range and the analog to digital converter for converting the output signal of the band-pass filter into the digital signal are integratedly contained in the apparatus body. Accordingly, the amplification of the detection signal of the vibration type gyroscope, the limitation of the frequency band of the output signal of the variable gain amplifier to a predetermined range and the analog to digital conversion of the output signal of the band-pass filter are performed at a range as near as possible to the vibration type gyroscope. Thus, the detection signal is prevented from being deteriorated by the influence of external noise in the transmission line. As a result, the transmission line can be used effectively, so that the signal can be transmitted at high-grade and high-fidelity.

Further, according to the present invention, the control circuit for generating control signals to control the amplification factor of the variable gain amplifier, the band width of the band-pass filter and the sampling rate of the analog to digital converter, respectively, on the basis of a digital control signal supplied from outside of the apparatus body is integratedly contained in the apparatus body. Accordingly, the dynamic range of the analog to digital conversion is used effectively by controlling the amplification factor and the band width. As a result, the detection signal can be transmitted with little distortion and good S/N ratio, so that the apparatus can be improved in operability and adapted to a wide-range of purposes of use.

Further, according to the present invention, since the linear correction circuit for correcting the nonlinear characteristic of the vibration type gyroscope is integratedly contained in the apparatus body, the nonlinear characteristic of the detection signal of the vibration type gyroscope is corrected to prevent the detection signal from being deteriorated by the influence of external noise in the transmission line. Accordingly, the transmission line can be used effectively, so that the signal can be transmitted at a higher-grade and higher-fidelity.

Further, according to the present invention, since the linear correction circuit for correcting the nonlinear characteristic of the vibration type gyroscope is integratedly contained in the apparatus body, the frequency band of the detected signal is limited to the predetermined range and the nonlinear characteristic of the detection signal of the vibration type gyroscope is corrected, so that the detection signal is prevented from being deteriorated by the influence of external noise in the transmission line. Accordingly, the transmission line can be used effectively, so that the signal can be transmitted at a higher-grade and higher-fidelity.

Further, according to the present invention, the dimension of the detection signal can be converted into the required dimension since the dimension converter for converting the dimension of the detection signal of the vibration type gyroscope is integratedly contained in the apparatus body.

Further, according to the present invention, the dimension of the detection signal can be converted into the required dimension while the frequency band thereof is limited to the predetermined range since the dimension converter for converting the dimension of the detection signal of the vibration type gyroscope is integratedly contained in the apparatus body.

INDUSTRIAL APPLICABILITY

According to the present invention, the vibration type gyroscope apparatus can be used in a control apparatus of an electronic appliance, which performs controlling on the basis of the swinging motion of a moving body, when the vibration type gyroscope is arranged to detect the swinging motion of the moving body in the form of a digital detection signal, and to control a signal to be controlled from the electronic appliance on the basis of the detection signal.

We claim:

1. A vibration type gyroscope apparatus comprising:

a body element;

a vibration type gyroscope for detecting a swinging motion of a moving body;

a variable gain amplifier for amplifying a detection output of said vibration type gyroscope;

an analog to digital converter for converting an output signal of said variable gain amplifier into a digital signal;

a band-pass filter of a variable band width for limiting a frequency band of said output signal of said variable gain amplifier to a predetermined range, wherein an output signal of said band-pass filter is supplied to said analog to digital converter; and a control circuit for generating first, second and third control signals to control an amplification factor of said variable gain amplifier, the band width of said band-pass filter and a sampling rate of said analog to digital converter, respectfully, said first, second and third control signals being generated based on a digital control signal supplied from outside said body element;

characterized in that said vibration type gyroscope, said variable gain amplifier, said analog to digital converter, said band pass filter and said control circuit are integratedly contained in said body element.

2. A vibration type gyroscope apparatus according to claim 1, characterized by further comprising a linear correction circuit contained in said body element and providing in an output side of said analog to digital converter for correcting the nonlinear characteristic of said vibration type gyroscope.

3. A vibration type gyroscope apparatus according to claim 1, characterized by further comprising a dimension converter contained in said body element and provided in an output side of said analog to digital converter for converting the dimension of vibration detected by said vibration type gyroscope.

4. A vibration type gyroscope apparatus according to claim 3, characterized in that said dimension converter is formed by a differentiator.

5. A vibration type gyroscope apparatus according to claim 3, characterized in that said dimension converter is formed by an integrator.

6. A vibration type gyroscope apparatus according to claim 1, characterized in that said vibration type gyroscope is formed by a piezoelectric vibration type gyroscope using a piezoelectric element for detecting the swinging motion of the moving body.

7. A vibration type gyroscope apparatus according to claim 6, characterized further comprising a linear correction circuit contained in said body element and provided in an output side of said analog to digital converter for correcting nonlinear characteristic of said vibration type gyroscope.

8. A vibration type gyroscope apparatus according to claim 6, characterized by further comprising a dimension converter contained in said body element and provided in an output side of said analog to digital converter for converting a dimension of vibration detected by said vibration type gyroscope.

9. A vibration type gyroscope apparatus according to claim 8, characterized in that said dimension converter is formed by a differentiator.

10. A vibration type gyroscope apparatus according to claim 8, characterized in that said dimension converter is formed by an integrator.

11. A vibration type gyroscope apparatus comprising:

a rod-like piezoelectric device for vibration provided with a pair of piezoelectric elements for detection providing respective output signals and a pair of piezoelectric elements for driving in response to a driving a differential amplifier for obtaining a differential between said output signals from said pair of piezoelectric elements for detection and producing an output signal;

an arithmetic operation circuit for multiplying said output signal of said differential amplifier by said driving signal supplied to said pair of piezoelectric elements for driving; and an encoding circuit for performing analog to digital conversion and encoding of an output signal of said arithmetic operation circuit by using, as sampling frequency, N (N=1, 2, 3 . . . ) times and 1/N times a frequency of said driving signal.

12. A vibration type gyroscope apparatus according to claim 11, characterized by further comprising a band-pass filter for removing carrier components from said output signal of said arithmetic operation circuit, wherein an output signal of said band-pass filter is supplied to said encoding circuit.

* * * * *